United States Patent [19]
Huang et al.

[11] Patent Number: 5,924,111
[45] Date of Patent: Jul. 13, 1999

[54] METHOD AND SYSTEM FOR INTERLEAVING DATA IN MULTIPLE MEMORY BANK PARTITIONS

[76] Inventors: Chu-Kai Huang, 217, Sec. 1, Hwa-May West, Taichung; Jin-Han Hsiao, No. 7, Lane 72, Ful-der St., Hsinfon, Hsinchu; Wei-Kuo Chia, 5th Fl., No. 5, Alley 156, Lane 376, Sec. 1, Kuang-Fu Rd., Hsin-Chu, all of Taiwan

[21] Appl. No.: 08/544,250

[22] Filed: Oct. 17, 1995

[51] Int. Cl.[6] .................................................. G06F 12/00
[52] U.S. Cl. ................................................. 711/5; 711/157
[58] Field of Search ........................... 364/246.4, 964.33, 364/966.3; 711/5, 157

[56] References Cited

U.S. PATENT DOCUMENTS

| | | | |
|---|---|---|---|
| 5,042,033 | 8/1991 | Costa | 371/2.1 |
| 5,051,889 | 9/1991 | Fung et al. | 364/200 |
| 5,247,645 | 9/1993 | Mirza et al. | 395/425 |
| 5,269,010 | 12/1993 | MacDonald | 395/425 |
| 5,293,607 | 3/1994 | Brockmann et al. | 395/425 |
| 5,301,292 | 4/1994 | Hilton et al. | 395/425 |
| 5,341,486 | 8/1994 | Castle | 395/425 |
| 5,349,372 | 9/1994 | Sellers | 345/185 |
| 5,479,624 | 12/1995 | Lee | 395/401 |
| 5,530,837 | 6/1996 | Williams et al. | 395/434 |

*Primary Examiner*—Eddie P. Chan
*Assistant Examiner*—Kevin Verbrugge
*Attorney, Agent, or Firm*—Proskauer Rose LLP

[57] ABSTRACT

A method and system for performing $2^n$-way interleaving of data words over P memory banks is disclosed. Each of the memory banks is partitioned into $2^n$ partitions. The data word (pixel) address space is partitioned into P contiguous sequences. Each of the P sequences of data word addresses is associated with a unique group of $2^n$ partitions. In each group, each partition is in a different memory bank. The data word addresses of each of the P sequences are then interleaved over the associated group of partitions. In interleaving the sequence of data word addresses, the data word addresses are alternately associated with sequential memory addresses in the group of partitions in a round-robin fashion. The method and system are particularly applicable where P is not a power of 2.

8 Claims, 7 Drawing Sheets

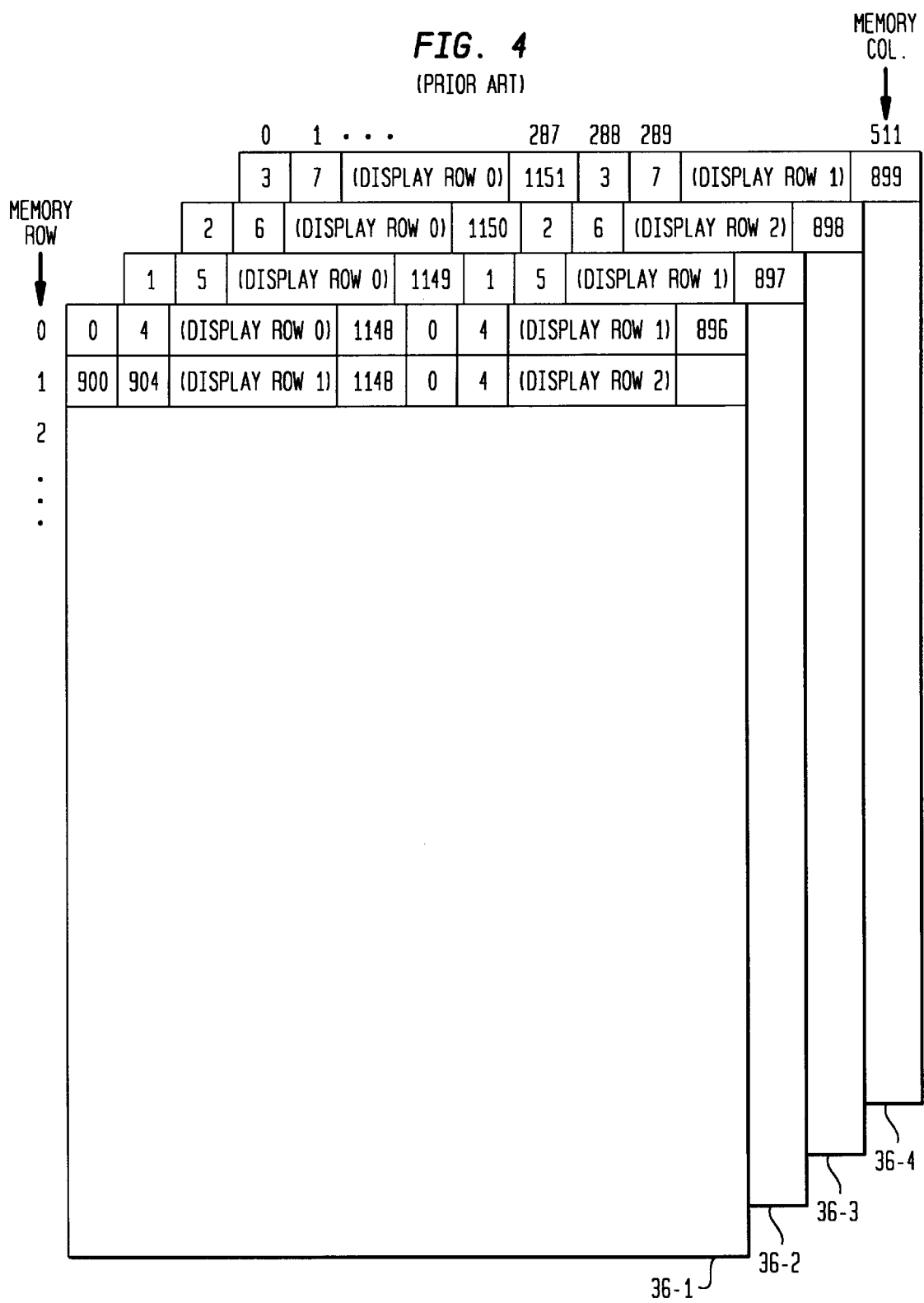

METHOD AND SYSTEM FOR INTERLEAVING DATA IN MULTIPLE MEMORY BANK PARTITIONS

RELATED APPLICATIONS

The following patents and patent applications are commonly assigned to the assignee of this application and contain subject matter related to this application:

1. U.S. Pat. No. 5,422,657, entitled, "A Graphics Memory Architecture For Multi-mode Display System," filed for Shu-Wei Wang, Wei-Kuo Chia, Chun-Kai Huang and Chun-Chie Hsiao on Sep. 13, 1993;

2. U.S. Pat. No. 5,321,425, entitled, "Resolution Independent Screen Refresh Strategy," filed for Wei-Kuo Chia, Jiunn-Min Jue, Gen-Hong Chen and Chih-Yuan Liu on Feb. 19, 1992;

3. U.S. Pat. No. 5,268,682, entitled, "Resolution Independent Raster Display System," filed for Wen-Jann Yang, Chih-Yuan Liu and Bor-Chuan Kuo on Oct. 7, 1991; and 4. U.S. Pat. No. 5,268,681, entitled, "Memory Architecture With Graphics Generator Including A Divide By Five Divider," filed for Cheun-Song Lin, Bor-Chuan Kuo and Rong-Chung Chen on Oct. 7, 1991.

The contents of the above-listed patents and patent applications are incorporated herein by reference.

FIELD OF THE INVENTION

The present invention relates to memory storage in computer systems. More particularly, the present invention relates to interleaving data in memory banks of the computer system, e.g., in the graphics controller.

BACKGROUND OF THE INVENTION

FIG. 1 depicts a conventional computer system 10. The computer system 10 has a processor 12, a main memory 14, a disk memory 16 and an input device 18, such as a keyboard and mouse. The devices 12–18 are connected to a bus 20 which transfers data, i.e., instructions and information, between each of these devices 12–18. A graphics controller 30 is also connected to the bus 20. As shown, the graphics controller 30 includes a drawing processor 31, a screen refresh controller 33 and a memory controller 32. The drawing processor 31 and screen refresh controller 33 output pixel addresses to the memory controller 32. The memory controller 32 is connected to the address inputs of a frame buffer 34. Illustratively, the frame buffer 34 comprises plural memory circuits 36-1, 36-2, 36-3 and 36-4. Illustratively, the memory circuits 36-1, 36-2, 36-3 and 36-4 are VRAMs or video random access, or DRAMs or dynamic random access memories such as the TMS44C251 manufactured by Texas Instruments™. Pixel data outputted from the frame buffer 34 is inputted to a digital to analog converter (DAC) 40 to produce an analog video signal. The analog video signal thus produced is displayed, e.g., in raster scan format, on the display device 42, e.g., a cathode ray tube (CRT) or liquid crystal display (LCD) monitor.

The display device 42 has a display screen with an array of pixels. The array can have a number of resolutions such as 1024×768, 1152×900, 1280×1024, 1600×1200, etc. In a refresh operation, the screen refresh controller 33 of the graphics controller 30 retrieves (reads-out) each pixel of a frame from the frame buffer 34 in row-column order. The retrieval of pixels is synchronized to the row-column raster scan of the display device 42 so that the appropriate luminance and chrominance signal is displayed on each pixel position of the display screen.

FIG. 2 illustrates the VRAMs 36-1 to 36-4 in greater detail. Each VRAM 36-1 to 36-4 includes a two-dimensional memory array 44 with plural storage locations for storing pixel data. The storage locations of the memory array 44 are organized into memory array rows and memory array columns. Each storage location is indexed by a memory address which includes a memory array row address component and a memory array column address component. For purposes of illustration, assume the VRAMs 36-1 to 36-4 each have a 256K*4 bit capacity, with 512 memory array rows and 512 memory array columns. As such, each address has 18 bits Address[17:0] including a 9 bit memory array row address component Address[17:9] and a 9 bit memory array column address component Address[8:0]. When a particular memory location is to be accessed (i.e., data is to be written into, or to be read-out from, a particular memory location), the 18 bit address of the memory location is inputted to the VRAM 36-1, 36-2, 36-3 or 36-4. The respective row and column address components are inputted to a Y-decoder 46 and an X-decoder 48, respectively. Control signals are also generated including a row address strobe (RAS) signal and a column address strobe (CAS) signal which strobe, i.e., store, the row and column address components in the Y-decoder 46 and X-decoder 48. The data access (read or write) can then occur to the addressed memory location. Note that the RAS signal need not always be generated. In some memory circuits 36-1 to 36-4, if multiple memory locations are to be accessed on the same row of the memory array 44, only the CAS signal need be generated to change the column address component. In such memory circuits, multiple sequential accesses to the same row of the memory array take less time than sequential accesses to different rows. (In the case the frame buffer 34 is implemented with static random access memories or SRAMs, the RAS and CAS signals are replaced by a single chip enable signal CE.)

Typically, pixels must be displayed at a much higher rate than they can be retrieved (read out) from each individual VRAM 36-1 to 36-4. For instance, pixel data may have to be produced at the rate of one pixel data every 9 nsec. However, the delay in retrieving a single pixel from the VRAM 36-1 may be 35 nsec. To enable displaying pixels at such a high rate, the pixel data is typically interleaved over the VRAMs 36-1, 36-2, 36-3 and 36-4 as illustrated in FIG. 2. In FIG. 2, the sequence of pixels which form each row are alternately stored in the VRAMs 36-1 to 36-4 in a round robin fashion. For instance, consider the sequence of pixel data to be displayed on row 0 of the display screen of the display device 42. The pixel data stored in column 0 of row 0 of the display device may be stored at address 0 (row 0 column 0 of the memory array 44) in VRAM 36-1. The next pixel, to be displayed in column 1 of row 0 may be stored in address 0 (row 0 column 0 of the memory array 44) of VRAM 36-2. The pixel to be displayed in column 2 of row 0 may be stored in address 0 (row 0 column 0 of the memory array 44) of VRAM 36-3. The pixel to be displayed in column 3 of row 0 may be stored in address 0 (row 0 column 0 of memory array 44) of VRAM 36-4. The pixel to be displayed in column 4 of row 0 may be stored in address 1 (row 0 column 1 of memory array 44) of VRAM 36-1 and so on.

When pixel data is read-out during a screen refresh operation, the screen refresh controller 33 (FIG. 1) outputs the pixel addresses of the pixels at the display rate (e.g., 9 nsec) of the display device 42 (FIG. 1). The memory controller 32 translates the pixel addresses to memory addresses and alternately outputs each memory address to the VRAMs 36-1 to 36-4 in a round robin fashion. That is, the first address is outputted to VRAM 36-1, the second address to VRAM 36-2, the third address to VRAM 36-3, the fourth address to VRAM 36-4, the fifth address to VRAM 36-1, etc. Note that the VRAM 36-1 has not completed reading out the first pixel data at the time the second VRAM 36-2 receives the address of the second pixel data. In fact, in this example, the VRAM 36-1 does not complete reading out the first pixel data until all of the VRAMs 36-2, 36-3 and 36-4 receive the addresses of the second, third and fourth pixel data. Thus, the read operations occur simultaneously in each VRAM 36-1 to 36-4 to produce the pixel data at the display rate of the display device 42.

Herein, the terms "the number of banks over which interleaving is performed," and "N-way interleaving" should be distinguished. The number of banks over which interleaving is performed is the total number of memory banks which receive interleaved data. N-way interleaving means that data is assigned, in a round robin fashion, to N memory banks. That is, each round, data is stored in only N of the number of memory banks over which interleaving is performed. In the above example, the number of banks over which interleaving is performed is 4 and 4-way interleaving is performed. As described below, in N-way interleaving, N need not equal the number of banks over which interleaving is performed.

Interleaving poses a problem for memory architecture design. Specifically, most interleaving techniques divide the available memory circuits into equal size banks. Particular bits of the memory address for data are used as bank selector bits. For instance, in FIG. 2, the addresses for the data may be 20 bits long, even though only 18 bits are needed to address each memory storage location of each VRAM memory array. The two least significant bits of the address of each data word may be used as a memory bank selector. Thus, if the two least significant bits are '00', VRAM 36-1 is selected for storing the data. If the two least significant bits are '01', VRAM 36-2 is selected., etc. The problem with this technique is that the number of memory banks must be a power of 2, i.e., 2 banks, 4 banks, 8 banks, etc. Memory circuits only come in fixed sizes such as 256K, 1M, 4M, etc. Consider a frame buffer which stores pixel data for a 1024×768 resolution display as 4 bytes of data. Such a frame buffer could be implemented with 3 VRAMs of 1 Mbyte each. However, in order to provide for interleaving, at least four banks of 1 Mbyte each must be provided. In short, more memory capacity than is needed must be provided to allow for interleaving.

Interleaving has also been considered in connection with the shared memory 14. However, the problems to be solved are slightly different. Consider that most computer systems 10 are provided with a shared memory 14 formed from a number of DRAMs. Typically, the DRAMs are organized into banks. The computer system 10 is usually sold with a certain amount of DRAMs occupying some, but not all, of the memory bank slots. (Usually, DRAM ICs are soldered onto small printed circuit cards called single in-line memory modules or SIMMs, which SIMMs are inserted into respective memory bank slots.) As such, additional vacant bank slots are available for adding more DRAMs to increase the total storage capacity. The shared memory 14 is designed to accommodate different permutations of numbers of memory circuits and storage capacities. The prior art has suggested using interleaving to decrease the access time of the shared memory 14, in general, although no specific minimal access time need be obtained.

U.S. Pat. No. 5,269,010 teaches a memory controller for generating RAS and CAS signals for plural memory banks. Each memory bank has two memory circuits which receive the same RAS and CAS signals. Each memory bank can have a different storage capacity. The memory controller also accommodates interleaving although no specific interleaving scheme is disclosed.

U.S. Pat. No. 5,301,292 discloses a circuit for 2-way, 4-way or no interleaving over memory banks. The disclosed circuit is specifically designed for memory architectures in which the memory capacity of each bank need not be the same. However, when the banks are the same, the memory controller circuit can accommodate 2 or 4 way interleaving of data words and blocks over a power of 2 number of banks. No specific interleaving examples are disclosed.

U.S. Pat. No. 5,051,889 teaches to interleave pages (e.g., 2 Kbyte blocks of data words) into different memory banks. The page size is selected to be the same as the amount of data that can be stored in a full row of the memory array of a bank. This enables retrieving a whole page without having to generate a RAS signal. In this patent, the number N, for N-way interleaving, equals the number of banks over which interleaving is performed.

U.S. Pat. No. 5,341,486 teaches a memory interleaving technique for accommodating a number of memory banks which is different than a power of 2, e.g., seven memory banks. The memory banks are divided into multiple subsets of powers of two. For instance, seven memory banks are divided into a subset of four banks, a subset of two banks and a subset of one bank. The address space of the data words is divided into appropriate contiguous segments which match the capacity of each subset. For instance, the data word address space is divided into $4/7$, $2/7$ and $1/7$ contiguous segments. The data words with addresses in the $4/7$ segment are 4-way interleaved over the first subset of four banks. The data words with addresses in the $2/7$ segment are 2-way interleaved over the second subset of two banks. Finally, the data words with addresses in the $1/7$ segment are stored in the last subset of one bank. In any event, the number N, for N-way interleaving, equals the number of banks in the respective subset over which interleaving is performed.

U.S. Pat. No. 5,293,607 teaches a memory architecture which can accommodate a number of memory banks other than a power of 2, e.g., seven memory banks. Data words are interleaved amongst a "moving" subset of four of the memory banks at one time. That is, data words are sequentially interleaved over banks 1–4, then over banks 2–5, then over banks 3–6, then over banks 4,5,6 and 1, etc. The data are furthermore stored at non-sequential addresses while being interleaved. For example, consider the storage of pixel data for row 0, columns 0,1,2,3,4,5, . . . of the display screen, in an interleaved fashion over banks 1–4. The pixel data for row 0, column 0 is stored at memory address 0 of bank 1. The pixel data for row 0, column 1 is stored at memory address 1 of bank 2. The pixel data for row 0, column 2 is stored at memory address 2 of bank 3. The pixel data for row 0, column 3 is stored at memory address 3 of bank 4. The pixel data for row 0, column 4 is stored at memory address 4 of bank 1. The pixel data for row 0, column 5 is stored at memory address 5 of bank 2, and so on. Therefore, 4-way interleaving is performed over 7 memory banks. In this case, the number N, for N-way interleaving, does not equal the number of banks over which interleaving is performed.

Consider now that the same frame buffer 34 (FIG. 1) may be used to display pixels on display monitors 42 (FIG. 1) with different resolutions. In any event, the row and column dimensions of the memory array 44 (FIG. 1) typically do not match the row and column dimensions of the display screen.

One manner of storing the data in the frame buffer 34 (FIG. 1) is to associate each row of pixel data on the display screen with a corresponding row in the VRAMs. Thus, pixel data on row 0 of the display screen is only stored on row 0 of the VRAMs 36-1 to 36-4, pixel data on row 1 of the display screen is only stored on row 1 of the VRAMs 36-1 to 36-4, etc. In order to store pixel data in this fashion, the VRAMs 36-1 to 36-4 must have memory arrays which are sufficiently wide to store a whole display screen row of pixel data. For example, in the case that the display is 1152×900, and the interleaving is over four VRAMs 36-1 to 36-4, then VRAMs may be provided having memory arrays with at least 288 columns each. The problem is that the dimensions of VRAM memory arrays are integral powers of 2. Thus, the closest matching VRAM is one with 512 columns. As such, no data is stored in the latter 224 columns of each VRAM row. This is shown in FIG. 3. Likewise, additional VRAMs 36-5, 36-6, 36-7 and 36-8 are needed to accommodate all 900 rows of pixel data that can be displayed on the display screen. In all, only about 50.2% of the storage capacity of the frame buffer 34 is utilized to store a frame of pixel data for display on the display screen.

Alternatively, the prior art has suggested a linear addressing strategy for storing pixel data such as is shown in FIG. 4. See U.S. Pat. Nos. 5,321,425, 5,268,682 and 5,268,681. A shown, the rows of the memory arrays are not strictly assigned to pixel data of corresponding rows of the display screen. Rather, the storage locations are assigned in strict sequential order to each pixel in order of increasing raster scan display order. As such, the pixel data of each row is stored sequentially and contiguously in each VRAM. For instance, consider the above example for a 1152×900 display screen using 256K*4 VRAMs. The pixel data of row 0, columns 0,4,8,12, . . . , 1148 are stored in row 0, columns 0,1,2,3, . . . , 287 of VRAM 36-1. The pixel data of row 1, columns 0,4,8,12, . . . , 896 are stored in row 0, columns 288, 289, 290, 291, . . . , 511 of VRAM 36-1. The remaining pixel data of row 1 of the display screen to be stored in VRAM 36-1, namely, the pixel data of columns 900, 904, 908, . . . , 1148, is stored on row 1 columns 0,1,2, . . . , 63 of the memory array 44 of the VRAM 36-1. Likewise, VRAM 36-2 stores pixel data of row 0, columns 1,5,9,13, . . . , 1149 in row 0, columns 0,1,2,3, . . . , 287, and pixel data of row 0, columns 0,5,9,13, . . . , 897 in row 0, columns 288, 289, 290, . . . , 511 of VRAM 36-2, and so on. The linear addressing scheme advantageously conserves storage capacity in the frame buffer 34.

Desirably, both interleaving and linear memory addressing are combined. U.S. Pat. No. 5,349,372 teaches a combined interleaving and linear addressing technique. According to this patent, pixel data is interleaved over three memory banks and linear addressing is used to organize the storage of pixel data in the memory banks. Each bank includes a single VRAM with 512 rows and 512 columns.

None of the prior art solutions is quite adequate for the general case of an arbitrary number of memory banks and varying interleaving. U.S. Pat. No. 5,269,010 teaches a flexible memory controller but does not teach any specific memory interleaving technique. U.S. Pat. No. 5,301,292 teaches a memory controller which can accommodate 2-way and 4-way interleaving of data words or pages (over a number of DRAM banks equal to a power of 2), but does not teach how to interleave over a number of memory banks which is not a power of 2. U.S. Pat. No. 5,051,889 teaches a circuit that interleaves pages over 2 memory banks so that RAS control signals can be avoided when multiple sequential accesses occur to the same page. Again, this patent does not teach how to interleave over a number of memory banks which is not a power of 2. U.S. Pat. No. 5,341,486 does teach how to interleave over a number of data banks which is not a power of 2 by dividing the memory banks into subsets of powers of 2. However, the number of banks over which interleaving occurs varies over each subset, i.e., 4-way interleaving is used over a subset of four banks while 2-way interleaving is used over a subset of two banks. This cannot be used in a VRAM if at least 4-way interleaving is necessary to retrieve pixel data at a precise rate. U.S. Pat. No. 5,293,607 teaches how to interleave data over a "moving" subset of four memory banks when the total number of memory banks is not a power of 2. However, the interleaving strategy is complicated requiring complex circuitry to determine both the correct bank and memory address in the bank. U.S. Pat. No. 5,349,372 teaches a frame buffer utilizing linear addressing and 3-way interleaving to interleave pixel data over three memory banks. However, the interleaving strategy is also complex since modulo three arithmetic is necessary to achieve the 3-way interleaving. Furthermore, no explanation is provided for interleaving over any other arbitrary number of banks (which number is not a power of two) or to provide a power of 2, i.e., $2^n$-way interleaving over the three banks.

It is therefore an object to overcome the disadvantages of the prior art. It is a particular object to provide a power of two, i.e., $2^n$,-way interleaving over a number of memory banks which is not a power of 2.

SUMMARY OF THE INVENTION

These and other objects are achieved by the present invention. Illustratively, the present invention provides for $2^n$-way (when n is an integer >0) interleaving over a number of memory banks which is not a power of 2. Unlike the prior art, a simple strategy is provided which enables address translation to memory banks using a small amount of circuitry.

According to an embodiment, a method is provided for interleaving data in P>2 memory banks. The storage locations of each of the P memory banks are partitioned into $2^n$ partitions, where $n \geq 1$. Next, the addresses of a sequential block of data words are partitioned into P sequences. The $P \cdot 2^n$ memory bank partitions are grouped into groups of $2^n$ partitions such that each one of the $2^n$ partitions in each group of partitions is located in a different memory bank. Each of the P groups of $2^n$ memory bank partitions is associated with a different one of the P sequences of data word addresses. Each of the sequences of data word addresses is then interleaved over the $2^n$ partitions of the associated group of partitions in a round-robin fashion. That is, the data words corresponding to a subsequence of $2^n$ of the addresses in the sequence of addresses are stored in different partitions of the associated group of partitions.

Illustratively, the assignment of data word address sequences to memory bank partitions is not arbitrary. Rather, the address sequences are assigned according to a particular ordering. Let i be an integer from 0 to P−1 and let j be an integer from 0 to $2^n-1$. Each partition is ordered with a unique combination of indexes (i,j) such that each $p^{th}$ memory bank in the range $2^n \leq p \leq P-1$ contains the $2^n$ partitions labeled (p,0), (p−1,1), . . . ,(p−$2^n$+1,$2^n$−1). Furthermore, each $p^{th}$ memory bank in the range 0 to $2^n$ −1 contains $2^n$−p−1 partitions labeled (P−1,$2^n$−p−1), (P−2,$2^n$−p−2), . . . , (P−$2^n$−p−1,$2^n$−1) and p+1 partitions labeled (0,p), (1,p−1), . . . ,(p,0). Within each of the P groups of partitions, each partition has the same index i. Illustratively, when interleaving data word addresses over a particular corresponding $i^{th}$ group of partitions, each address is associated with a sequential memory address in a partition selected in round robin fashion in order of the index j of the partition. For instance, consider the data addresses associated with the $2^n=4$ (for n=2) partitions having indexes (i,j) of (0,0), (0,1), (0,2), (0,3). Suppose the data word address sequence to be interleaved is 0,1,2,3,4, . . . , 15 Data word addresses 0,4,8,12 are associated with memory addresses 0,1,2,3, respectively, in partition (0,0). Data word addresses 1,5,9,13 are associated with memory addresses 0,1,2,3, respectively, in partition (0,1). Data word addresses 2,6,10,14 are associated with memory addresses 0,1,2,3, respectively, in partition (0,2). Data word addresses 3,7,11,15 are associated with memory addresses 0,1,2,3, respectively, in partition (0,3).

The interleaving scheme according to the present invention is very simple. The particular memory bank and partition in which a data word is stored is determined by the $\lceil \log_2 P \rceil$ most significant bits (A) and n least significant bits (B) of the address of the data word. The bits A and B may be concatenated together and used to access a look up table to retrieve an indication of the partition in which the data word is stored. This indication may include an offset address, i.e., the starting address of the partition in the memory bank, and appropriate control signals for enabling the correct memory bank and transferring a memory address thereto. The offset address may be combined with the address of the data word (from which the A and B bits have been stripped) and outputted to the correct memory bank.

To access a particular data word, a memory controller circuit may be provided. The memory controller circuit performs the above steps in interleaving data words over the memory bank. In performing those steps, the memory controller illustratively outputs, control signals (such as RAS and CAS or CE signals) and memory addresses to each memory bank. Only $2^n$ memory address signals need be outputted. Each $q^{th}$ memory address signal, for q=0 to $2^n-1$, is outputted to each memory bank containing the partition (p,0) for which p modulus 2n=q. Consider the partitions of a particular group, which partitions each have the same index i. Some of these partitions may be in memory banks which receive the same $q^{th}$ memory address signal. If so, such partitions illustratively have identical memory address ranges in their respective memory banks.

In short, a method and system are provided for interleaving data over a number of memory banks which is different than a power of 2. The interleaving scheme is simple and conserves memory circuits without sacrificing the benefits of interleaving for various applications, such as frame buffers.

BRIEF DESCRIPTION OF THE DRAWING

FIG. 4 illustrates a frame buffer storage organization with linear addressing.

DETAILED DESCRIPTION OF THE INVENTION

The invention is illustrated herein in the context of a frame buffer wherein each memory IC has a memory array with a number of storage location that is a power of 2. Such an embodiment provides a useful illustration because a certain minimal memory access time is required for every memory access in order to display pixel data in a timely fashion.

Figure 1:
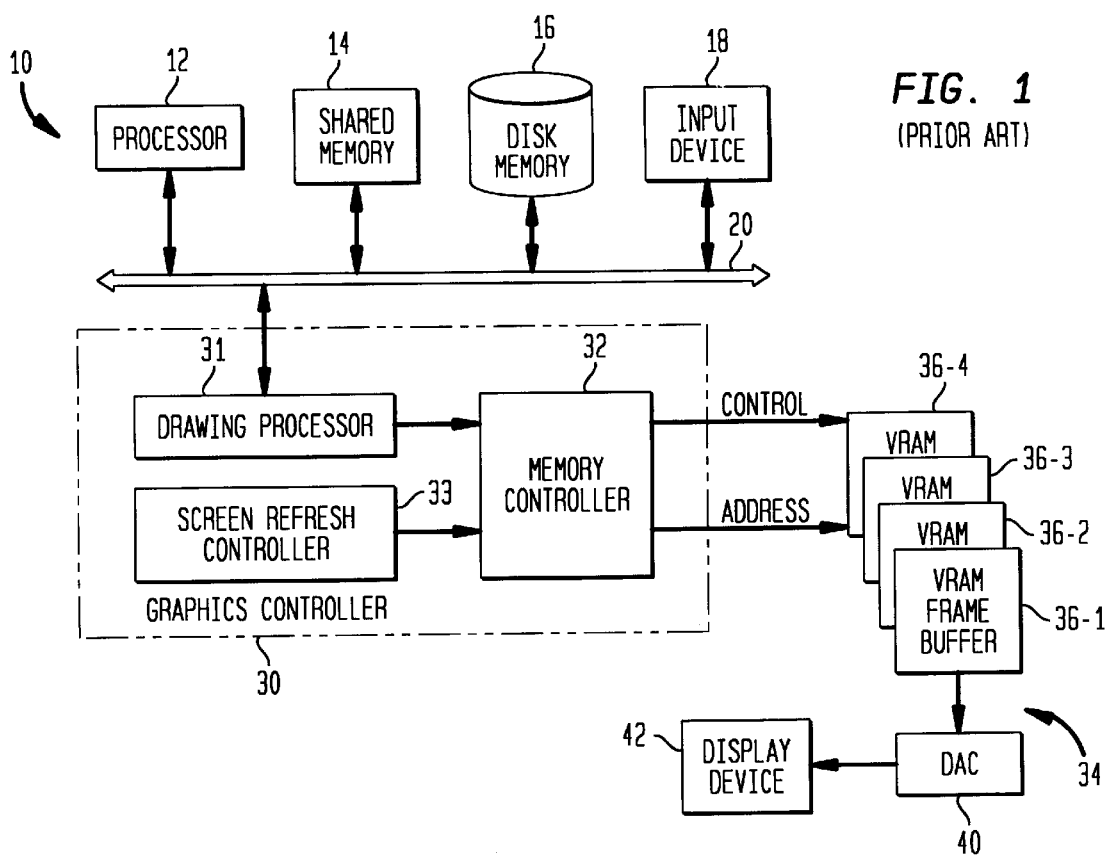
FIG. 1 illustrates a conventional computer system.
Figure 5:
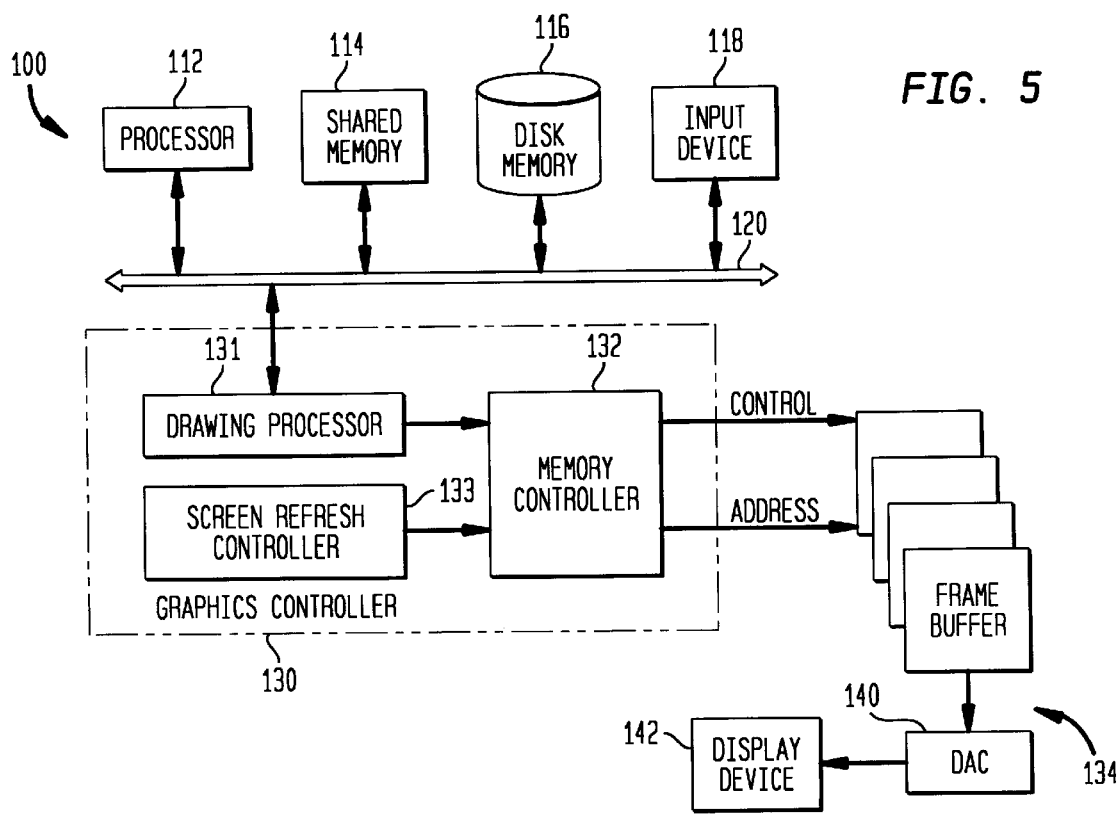
FIG. 5 illustrates a computer system according to an embodiment of the present invention.
Figure 2:
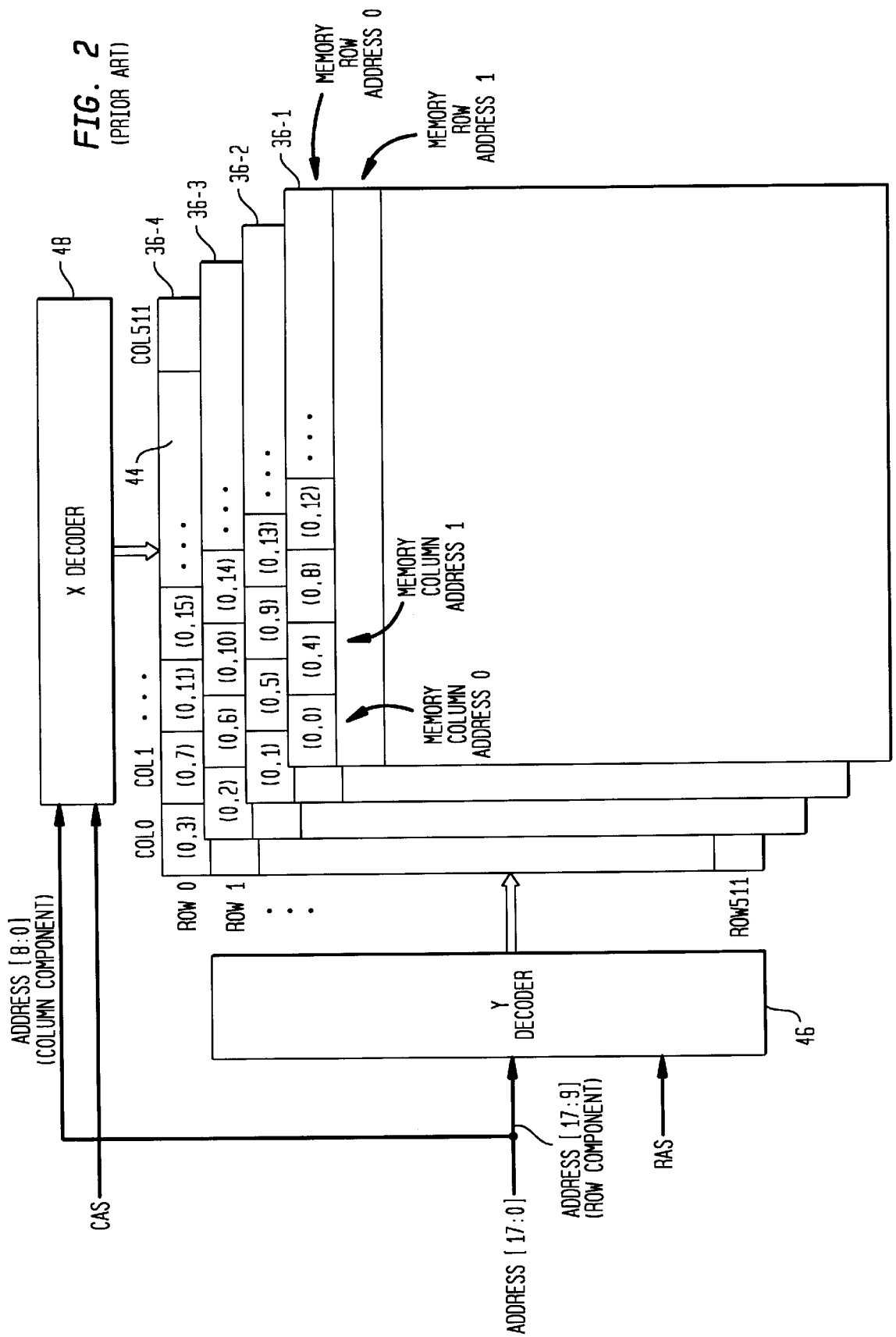
FIG. 2 illustrates a conventional interleaving of data words over multiple memory banks.
Figure 3:
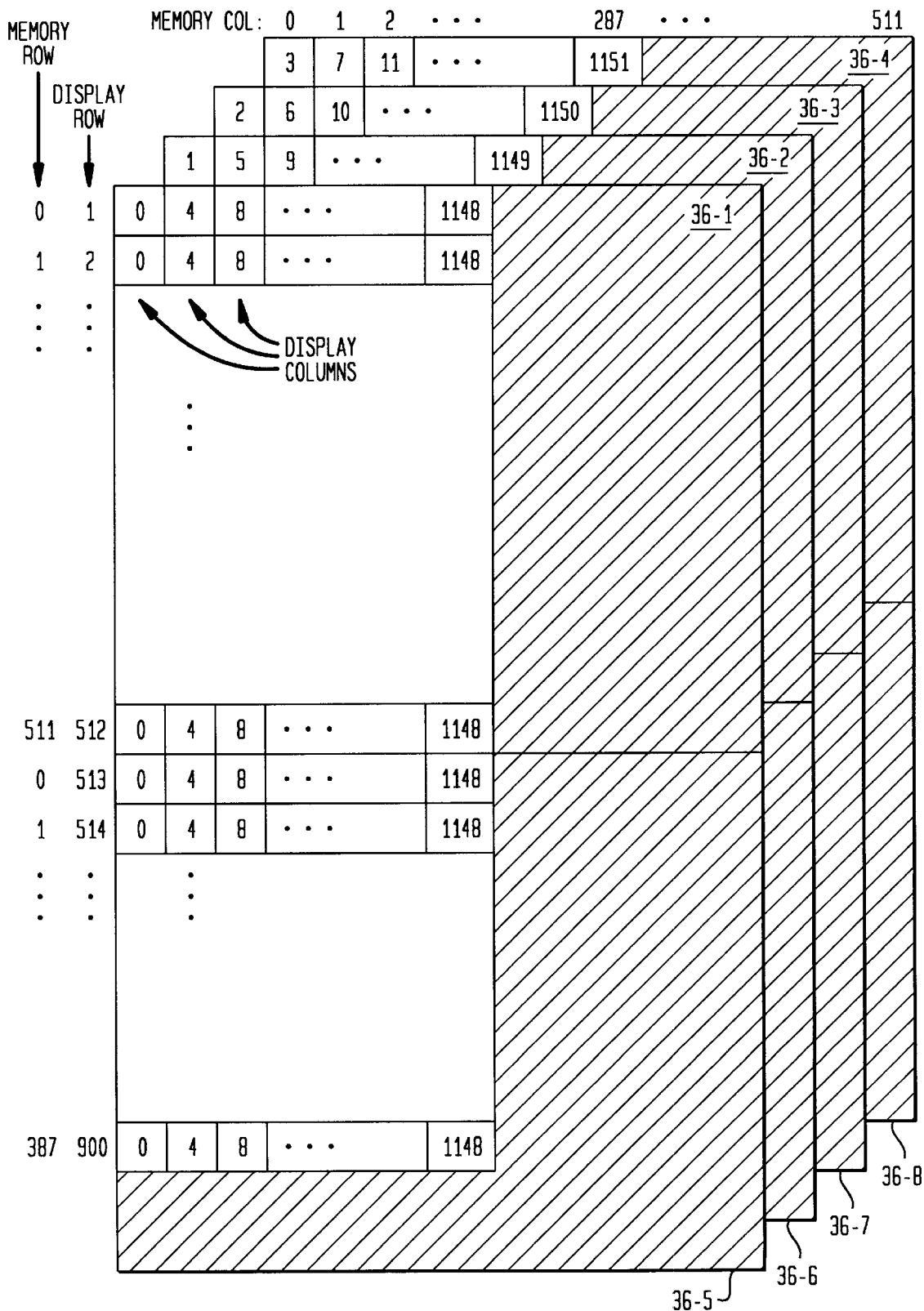
FIG. 3 illustrates a frame buffer storage organization without linear addressing.

FIG. 5 depicts a computer system 100 according to one embodiment of the present invention. The computer system 100 has a processor 112, a shared memory 114, a disk memory 116 and an input device 118 such as a keyboard and mouse. Each of the devices 112–118 is connected to a system bus 120. The system bus 120 enables the transfer of data, i.e., program instructions and information, amongst the devices 112–118. Also connected to the system bus 120 is a graphics controller 130. The graphics controller 130 includes a drawing processor 131, a screen refresh controller 133 and a memory controller 132. The memory controller 132 is connected to control (i.e., RAS and CAS or CE) inputs and address inputs of a frame buffer 134. The memory controller 132 receives instructions to read pixel data from, and write pixel data into, the frame buffer 134 from the drawing processor 131 and screen refresh controller 133. In response, the memory controller 132 may translate the address of the pixel data and output appropriate control and address signals to the frame buffer 134 for accessing the desired pixel data. The pixel data read out of the frame buffer 134 may be inputted to a DAC 140 and then displayed on the display device 142.

Figure 6:
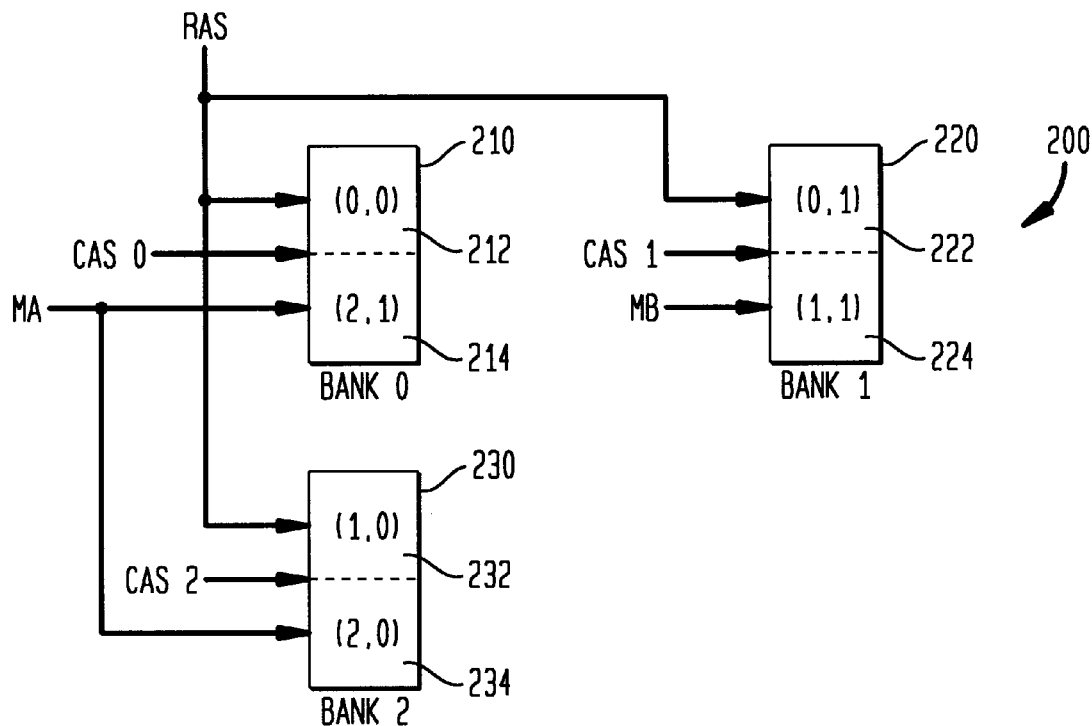
FIG. 6 illustrates 2-way interleaving over three memory banks according to an embodiment of the present invention.

According to the invention, data word addresses, i.e., pixel addresses, are interleaved over a number of memory banks which need not be a power of two. Nevertheless, N-way interleaving is maintained throughout all of the memory banks in a simple fashion. Consider for example, the frame buffer 200 shown in FIG. 6. In this case, it is desirable to provide a frame buffer for storing pixel data for a 1024×768 display screen resolution. Illustratively, 1 Mbyte (1,048,576 byte) VRAMs are used and each pixel is represented by 32 bit data. Using a linear addressing scheme, only three 1 Mbyte VRAMs 210, 220 and 230 are necessary to store the pixel data.

Desirably, a $2^n$-way interleaving scheme is utilized to store the data in the VRAMs 210, 220 and 230. For instance, the access time of the VRAMs 210, 220 and 230 may be 35 nsec while pixel data must be retrieved at the rate of 20 nsec. Therefore, an interleaving of $2^{n-1}=2$ is sufficient to enable displaying pixels. To achieve the $2^n$-way interleaving, the VRAMs 210, 220 and 230 are organized into P=3 separate banks (the VRAM 210 forming bank 0, the VRAM 220 forming bank 1 and the VRAM 220 forming bank 2). The storage locations of each of the P=3 banks are then partitioned into $2^{n-1}$ or 2 partitions. For instance, the VRAM 210 is partitioned into the partitions 212 and 214. The VRAM 220 is partitioned into the partitions 222 and 224. The VRAM 230 is partitioned into the partitions 232 and 234. In this case, each partition illustratively contains 512 K storage locations. (Assume for sake of example that each storage location contains one byte and that four bytes can be retrieved in a single memory access.) The range of memory addresses of the each of the partitions 212, 222 and 232 is 0 to 524,287 (or 0000 0000 0000 0000 to 1111 1111 1111 1111 1111). Likewise the range of memory addresses of each of the partitions 214, 224, and 234 is 524,288 to 1,048,575 (or 1000 0000 0000 0000 0000 to 1111 1111 1111 1111 1111).

Each partition is labeled with two indexes i and j, where $0 \leq i \leq P-1$ and $0 \leq j \leq 2^n-1$. The index i indicates a group number of the partition which is explained in greater detail below. The index j indicates a sequential ordering within a particular group. In this case, i goes from 0 to 2 and j goes from 0 to 1.

No two partitions in the same memory bank 210, 220 or 230 have the same index i. Furthermore, $2^n$ partitions total, over all of the partitions, are labeled with the same index i. Each partition with a particular index i is labeled with a second index j such that the combination of indexes (i,j) is unique over all partitions 212, 214, 222, 224, 232 and 234.

The above labeling assists in describing the association of partitions with pixel data addresses. The pixel data address space is divided into P=3 sequences. In this case, the pixel addresses of the pixel data for the entire screen has a range from 0 to 3,145,727 3M or (00 0000 0000 0000 0000 0000 to 10 1111 1111 1111 1111 1111). The pixel data address space can be easily divided into the following three sequences: 0 to 1,048,575 (00 0000 0000 0000 0000 0000 to 00 1111 1111 1111 1111 1111); 1,048,576 to 2,097,151 (01 0000 0000 0000 0000 0000 to 01 1111 1111 1111 1111 1111); and 2,097,152 to 3,145,727 (10 0000 0000 0000 0000 0000 to 10 1111 1111 1111 1111 1111). As noted above, an address can be easily correlated to its respective sequence by the $\lceil \log_2 P \rceil = \lceil \log_2 3 \rceil = 2$ most significant bits of the address. (The symbol '$\lceil x \rceil$' denotes "ceiling of x" or the nearest integer that is greater than or equal x.) For instance, all addresses in the first sequence have '00' as the two most significant bits. All addresses in the second sequence have '01' as the two most significant bits. Likewise, all addresses in the third sequence have '10' as the two most significant bits. Each sequence of pixel data addresses is then associated with a particular group i of $2^n=2$ partitions. In this case, the first sequence of addresses is associated with the group i=0, the second sequence of addresses is associated with the group i=1 and the third sequence of addresses is associated with the group i=2.

The addresses of each sequence are then interleaved over the partitions of the associated group. For instance, the addresses in the first sequence are alternately (in a round robin fashion) associated with the partitions 212 and 222. As such, all of the even addresses are associated with partition 212 and all of the odd addresses are associated with partition 222. For instance, pixel data with pixel address 0 is stored in memory address 0 of bank 210. Pixel data with pixel address 1 is stored at address 0 of bank 220. Pixel data with pixel address 2 is stored at address 1 of bank 210, an so on. The addresses in the second sequence are alternately associated with the partitions 232 and 214 so that all of the even addresses are associated with the partition 232 and all of the odd addresses are associated with the partition 214. Thus, pixel data with pixel addresses 1,048,576, 1,048,578, 1,048, 580, . . . are stored at addresses 0,1,2, . . . of bank 230. Pixel data with pixel addresses 1,048,577, 1,048,579, 1,048,581, . . . are stored at addresses 524,288, 524,289, 524,290,... of bank 220. The addresses in the third sequence are alternately associated with the partitions 234 and 214 so that all of the even addresses are associated with the partition 234 and all of the odd addresses are associated with the partition 214. Thus, pixel data with pixel addresses 2,097,152, 2,097,154, 2,097,156, . . . are stored at addresses 524,288, 524,289, 524,290, . . . . of bank 230. Pixel data with pixel addresses 2,097,153, 2,097,155, 2,097,157, . . . are stored at addresses 524,288, 524,289, 524,290, . . . . of bank 210.

Each of the banks 210, 220 and 230 is provided with the same RAS signal. However, each bank 210, 220 and 230 receives a different CAS signal; the bank 210 receiving CAS0, the bank 220 receiving CAS1 and the bank 230 receiving CAS2. To effect the $2^n=2$ interleaving, a total of $2^n=2$ memory address signals must be provided. The banks 210 and 230 receive the same memory address MA. The bank 220 receives a different memory address MB. Note that banks 210 and 230, which receive the same memory address MA each have a partition with the same group index i=2, namely partitions 214 and 234. Illustratively, partitions of the same group i which are also located in memory banks that receive the same memory address have the same memory address range (i.e., 524,288 to 1,048,575) in their respective banks.

With the above interleaving method, each pixel address can be translated in a simple fashion into the appropriate memory address and control signals. The data access for the pixel address then occurs on the memory address associated therewith according to the above interleaving process. Each pixel address in this example has 22 bits referred to as PA[21:0] where PA[0] is the least significant bit of the pixel address and PA[21] is the most significant bit of the pixel address. Illustratively, the $\lceil \log_2 P \rceil$ most significant bits are used to indicate over which group of partitions a particular pixel address has been interleaved. The n least significant bits indicate which particular partition of the group contains the particular pixel data. In this case, the $\lceil \log_2 P \rceil = \lceil \log_2 3 \rceil = 2$ most significant bits PA[21:20] and the n=1 least significant bit PA[0] indicate the partition in which the pixel data is stored. The following look up table can be used to activate the appropriate bank and partition for storage:

TABLE 1

| PA[21:20],PA[0] | Partition (i,j) | Memory address | CAS | Offset |
| --- | --- | --- | --- | --- |
| 000 | 0,0 (212) | MA | CAS0 | 0 |
| 001 | 0,1 (222) | MB | CAS1 | 0 |
| 010 | 1,0 (232) | MA | CAS2 | 0 |
| 011 | 1,1 (224) | MB | CAS1 | 512K |
| 100 | 2,0 (234) | MA | CAS2 | 512K |
| 101 | 2,1 (214) | MA | CAS0 | 512K |

Given a particular pixel address with bits PA[21:0], the log $\lceil \log_2 P \rceil = 2$ most significant bits PA[21:20], and the n=1 least significant bit PA[0], are stripped leaving an address of PA[19:1]. A bit of logic '0' (for an offset of 0) or logic '1' (for an offset of 512K) is concatenated, as bit PA[20]', to the bits PA[19:1] to form the 20 bit memory address. Depending on the bits PA[21:20],PA[0], an appropriate CAS signal (i.e., CAS0, CAS1 or CAS2) is generated to enable the correct memory bank and the newly formed address PA[20]',PA [19:1] is outputted as either the memory address MA[19:0] or the memory address MB[19:0] depending on the bits PA[21:20],PA[0].

Figure 7:
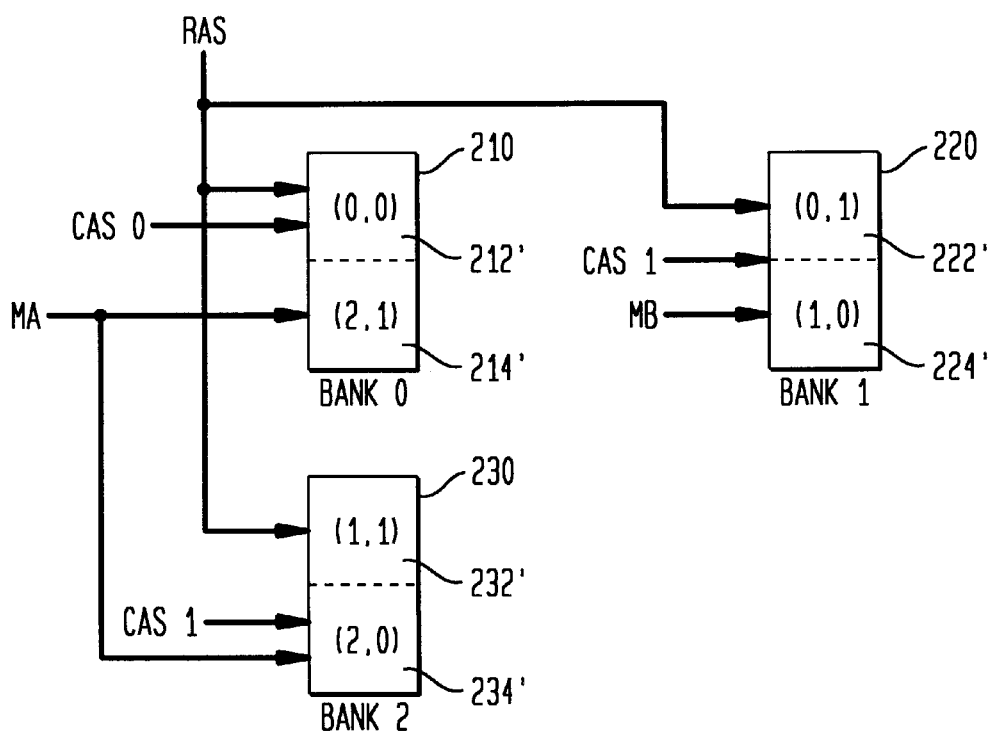
FIG. 7 illustrates an alternate 2-way interleaving over three memory banks according to an embodiment of the present invention.

FIG. 7 illustrates an alternative partitioning of the VRAM memory banks 210, 220 and 230 to achieve the same 2-way interleaving. Assume that the memory capacities and display resolution is the same as described before. In this case, the partitions are as follows: partition 212' is (0,0), partition 214' is (2,1), partition 222' is (0,1), partition 224' is (1,0), partition 232' is (1,1) and partition 234' is (2,0). The following table summarizes the translation of addresses and generation of control signals:

TABLE 1

| PA[21:20],PA[0] | Partition (i,j) | Memory address | CAS | Offset |
|---|---|---|---|---|
| 000 | 0,0 (212') | MA | CAS0 | 0 |
| 001 | 0,1 (222') | MB | CAS1 | 0 |
| 010 | 1,0 (224') | MB | CAS1 | 512K |
| 011 | 1,1 (232') | MA | CAS2 | 0 |
| 100 | 2,0 (234') | MA | CAS2 | 512K |
| 101 | 2,1 (214') | MA | CAS0 | 512K |

The translation of addresses is otherwise similar as described before.

Consider now a frame buffer for a display device with a resolution of 1280×1024 wherein each pixel data is 32 bits. Using a linear addressing scheme, a total of 5 Mbytes are necessary to store an entire frame of pixel data. However, the maximum permissible access delay for a screen refresh may be as little of 10 nsec. Suppose the frame buffer 134 (FIG. 5) is formed from 35 nsec delay DRAMs. In this case $2^n=2^2=4$-way interleaving must be used to retrieve pixels at the requisite rate for a screen refresh.

Figure 8:
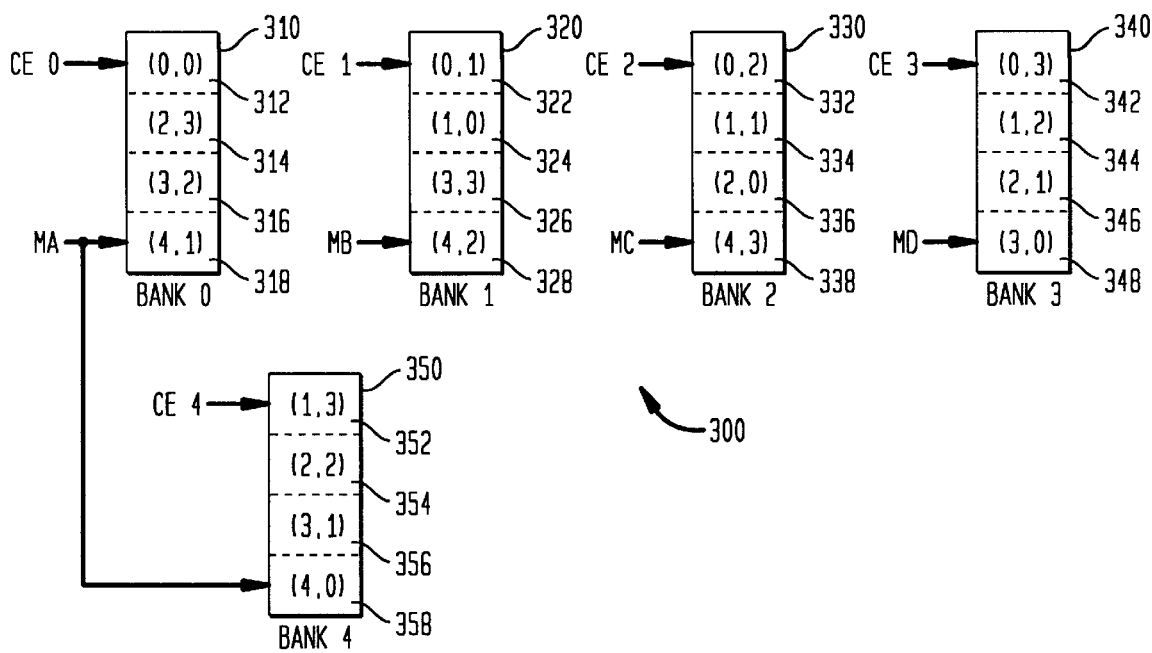
FIG. 8 illustrates 4-way interleaving over five memory banks according to an embodiment of the present invention.

FIG. 8 depicts a frame buffer 300 architecture according to an embodiment of the present invention for the above example. In this case, the frame buffer 300 includes P=5 memory banks 310, 320, 330, 340 and 350 each with a 1 Mbyte storage capacity. Each of the memory banks is partitioned into $2^n$=4 partitions 312, 314, 316, 318, 322, 324, 326, 328, 332, 334, 336, 338, 342, 344, 346, 348, 352, 354, 356 and 358. The indexing of the partitions is as follows:

TABLE 3

| Partition | (i,j) | Partition | (i,j) | Partition | (i,j) |
|---|---|---|---|---|---|
| 312 | 0,0 | 328 | 4,2 | 346 | 2,1 |
| 314 | 2,3 | 332 | 0,2 | 348 | 3,0 |
| 316 | 3,2 | 334 | 1,1 | 352 | 1,3 |
| 318 | 4,1 | 336 | 2,0 | 354 | 2,2 |
| 322 | 0,1 | 338 | 4,3 | 356 | 3,1 |
| 324 | 1,0 | 342 | 0,3 | 358 | 4,0 |
| 326 | 3,3 | 344 | 1,2 | | |

Note that i is from 0 to P−1=4 and j is from 0 to $2^n-1=2^2-1=3$. Note also that $q=2^n=2^2=4$ different memory address signals MA, MB, MC and MD are necessary to effect the 4-way interleaving. The memory banks 310 and 350 receive the memory address signal MA, the memory bank 320 receives the memory address signal MB, the memory bank 330 receives the memory address signal MC and the memory bank 340 receives the memory address signal MD.

The memory partitions each have a range of memory addresses (which illustratively are equal sized ranges). The ranges are summarized in the following table:

TABLE 4

| Partitions | Start address | End address |
|---|---|---|
| 312, 322, 332, 342, 352 | 0 | 262,143 |
| 314, 324, 334, 344, 354 | 262,144 | 524,287 |
| 316, 326, 336, 346, 356 | 524,288 | 786,431 |
| 318, 328, 338, 348, 358 | 786,432 | 1,048,576 |

The pixel address range is from 0 to 5,242,879. The pixel addresses are divided into the following contiguous subsequences: the first sequence includes pixel addresses 0 to 1,048,575; the second sequence includes pixel addresses 1,045,576 to 2,097,151; the third sequence includes pixel addresses 2,097,152 to 3,145,728; the fourth sequence includes pixel addresses 3,145,727 to 4,194,303; and the fifth sequence includes pixel addresses 4,194,304 to 5,242, 879. Each pixel address has a total of 23 bits PA[22:0] of which the $\lceil \log_2 P \rceil = \lceil \log_2 5 \rceil = 3$ most significant bits indicate to which sequence the pixel address belongs. The sequences of addresses are assigned to groups of memory partitions as follows: the first sequence is assigned to group i=0, the second sequence is assigned to group i=1, the third subsequence is assigned to group i=2, the fourth sequence is assigned to group i=3 and the fifth sequence is assigned to group i=4.

Note that memory banks 350 and 310 contain three partitions each, namely 314, 316, 318 and 354, 356, 358 which are in the same group. That is, partitions 314 and 354 are both in group i=2, partitions 316 and 356 are both in group i=3, and partitions 318 and 358 are both in group i=4. The groups in the same partitions in these memory banks have the same ranges of memory addresses because both memory banks 310 and 350 receive the same memory address signal MA.

In this example, the $\lceil \log_2 P \rceil = \lceil \log_2 5 \rceil = 3$ most significant bits, and n=2 least significant bits of each pixel address can be used to translate the pixel address PA[22:0] into a memory address and appropriate control signals. In this case, each DRAM 310, 320, 330, 340 and 350 is enabled with its own CE signal rather than the RAS and CAS signals. The translation of signals is summarized in the table below:

TABLE 5

| PA[22:20],PA[1:0] | Partition (i,j) | Memory address | CE | Offset |
|---|---|---|---|---|
| 00000 | 0,0 (312) | MA | CE0 | 0 |
| 00001 | 0,1 (322) | MB | CE1 | 0 |
| 00010 | 0,2 (332) | MC | CE2 | 0 |
| 00011 | 0,3 (342) | MD | CE3 | 0 |
| 00100 | 1,0 (324) | MB | CE2 | 256K |
| 00101 | 1,1 (334) | MC | CE3 | 256K |
| 00110 | 1,2 (344) | MD | CE3 | 256K |
| 00111 | 1,3 (352) | MA | CE4 | 0 |
| 01000 | 2,0 (336) | MC | CE2 | 512K |
| 01001 | 2,1 (346) | MD | CE3 | 512K |
| 01010 | 2,2 (352) | MA | CE4 | 256K |
| 01011 | 2,3 (314) | MA | CE0 | 256K |
| 01100 | 3,0 (348) | MD | CE3 | 768K |
| 01101 | 3,1 (356) | MA | CE4 | 512K |
| 01110 | 3,2 (316) | MA | CE0 | 512K |
| 01111 | 3,3 (326) | MB | CE1 | 512K |
| 10000 | 4,0 (358) | MA | CE4 | 768K |
| 10001 | 4,1 (318) | MA | CE0 | 768K |
| 10010 | 4,2 (328) | MB | CE1 | 768K |
| 10011 | 4,3 (338) | MC | CE2 | 768K |

In translating the pixel address PA[22:0] to a memory address MA, MB, MC or MD, the $\lceil \log_2 P \rceil = \lceil \log_2 5 \rceil = 3$ most significant bits PA[22:20], and n=2 least significant bits PA[1:0] of each pixel address are stripped. Two substitute bits PA[21:20]' are provided to effect the appropriate offset. If the offset is 0, the bits PA[21:20]'='00'. If the offset is 256K, the bits PA[21:20]'='01'. If the offset is 512K, the bits PA[21:20]'='10'. If the offset is 768K, the bits PA [21:20] '='11'. The bits PA[21:20]',PA[19:2] form the 20 bit address MA[19:0], MB[19:0], MC[19:0] or MD[19:0] which are inputted to the appropriate memory bank 310–350. Note how the n=2 least significant bits cause the pixel addresses to interleave over the four memory partitions of the respective group of partitions.

Figure 9:
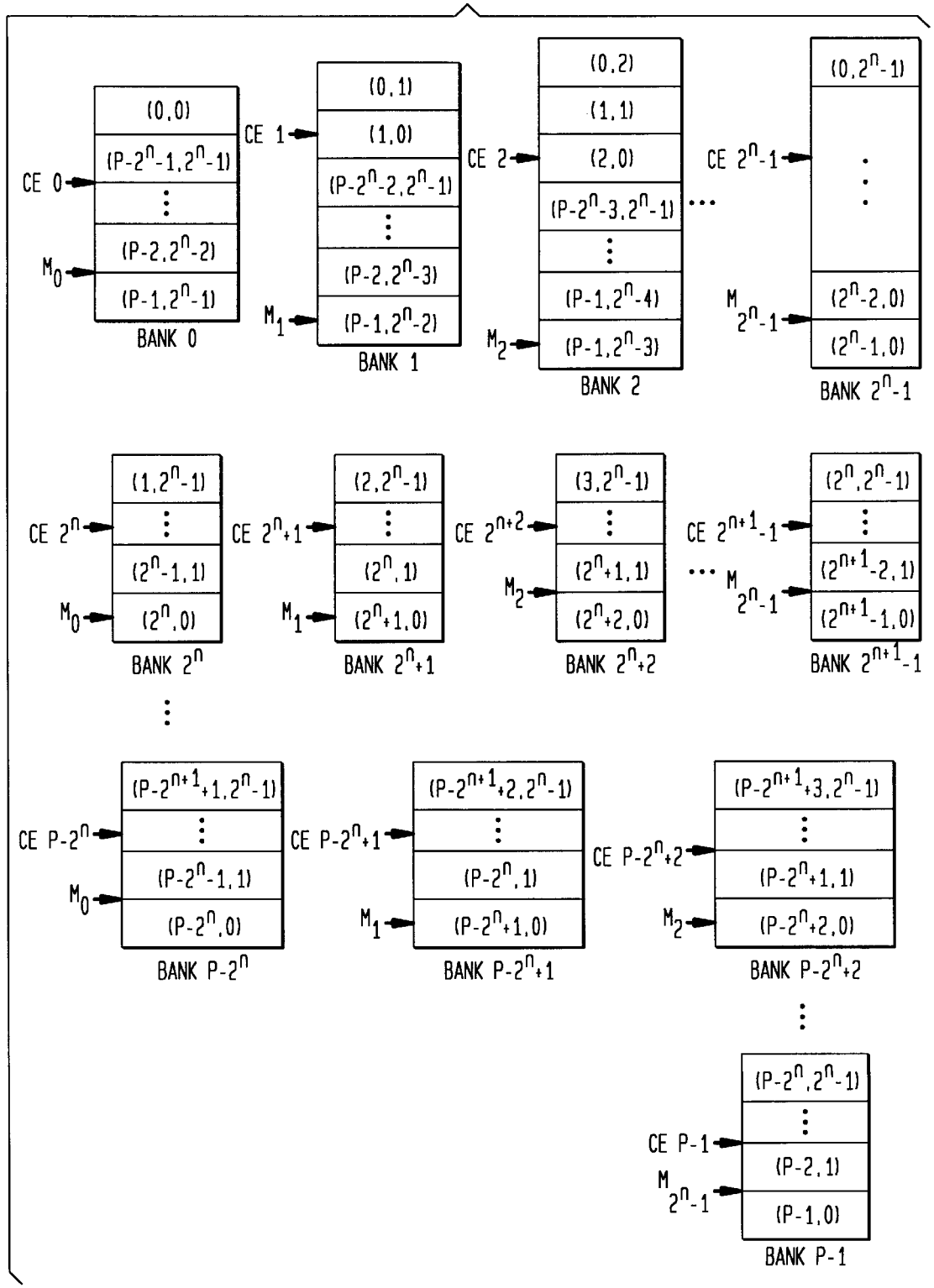
FIG. 9 illustrates a general $2^n$-way interleaving over P memory banks according to an embodiment of the present invention.

FIG. 9 shows the general case of interleaving $2^n$-way over P memory banks. The number of memory address signals $M_q$ which must be provided is $2^n$. Note that the $q^{th}$ memory address $M_q$, for $0 \leq q \leq P-1$, is inputted to each memory bank which contains the partition (p,0), where p modulus $2^n=q$. That is, memory address $M_0$ is inputted to memory banks p=0, p=$2^n$, p=$2^{n+1}$, . . . , memory address $M_1$ is inputted to memory banks p=1, p=$2^n$+1, p=$2^{n+1}$+1, . . . , etc. The number of unique chip enable signals which must be provided is P. Each memory bank is divided into $2^n$ partitions (which illustratively have the same number of address spaces). The number of groups of partitions which must be provided is P. Each partition is labeled with an index i,j to indicate the group number and interleave ordering within each group of each partition. Note that each $p^{th}$ memory bank for p in the range of $2^n \geq p \geq P-1$ contains the partitions (p,0), (p-1,1), . . .,(p-$2^n$+1,$2^n$-1). Each $p^{th}$ memory bank for p in the range of $0 \leq p \leq 2^n-1$ contains $2^n$-p-1 partitions labeled (P-1,$2^n$-p-1), (P-2,$2^n$-p-2), . . . , (P-$2^n$-p-1,$2^n$-1) and p+1 partitions labeled (0,p), (1,p-1), . . . ,(p,0). As above, the pixel address space illustratively has P·$2^{m+n}$ addresses from 0 to P·$2^{m+n}$-1, where m is any integer, such as 18 (256K), 20 (1M), 22 (4M), etc., and n is a an integer $\geq 1$. Therefore, each pixel address has $\lceil \log_2 P \rceil$+m+n bits. The $\lceil \log_2 P \rceil$ most significant bits indicate the group of partitions to which the pixel address belongs. The n least significant bits indicate the specific one of the partitions within the group to which the pixel address belongs.

The offset address of each partition can vary depending on the specific organization of each partition in its respective memory bank. However, as shown in FIG. 9, a certain convention is followed. For p in the range of $2^n \leq p \leq P-1$, the offset is (i-p+$2^n$-1)·$2^{m-n}$. For p in the range of $0 \leq p \leq 2^n-1$ the offset for the $2^n$-p-1 partitions labeled (P-1,$2^n$-p-1), (P-2,$2^n$-p-2), . . . , (P-$2^n$-p-1,$2^n$-1) is (i-P+$2^n$)·$2^{m-n}$ and the offset for the p+1 partitions (0,p), (1,p-1), . . . , (p,0) is i·$2^{m-n}$. Again, such offsets can be achieved by concatenating the correct sequence of n bits PA[m+2n-1:m+n]' as the most significant bits of the address. The m least significant bits of the address include the bits PA[m+n:n] of the original pixel address.

Figure 10:
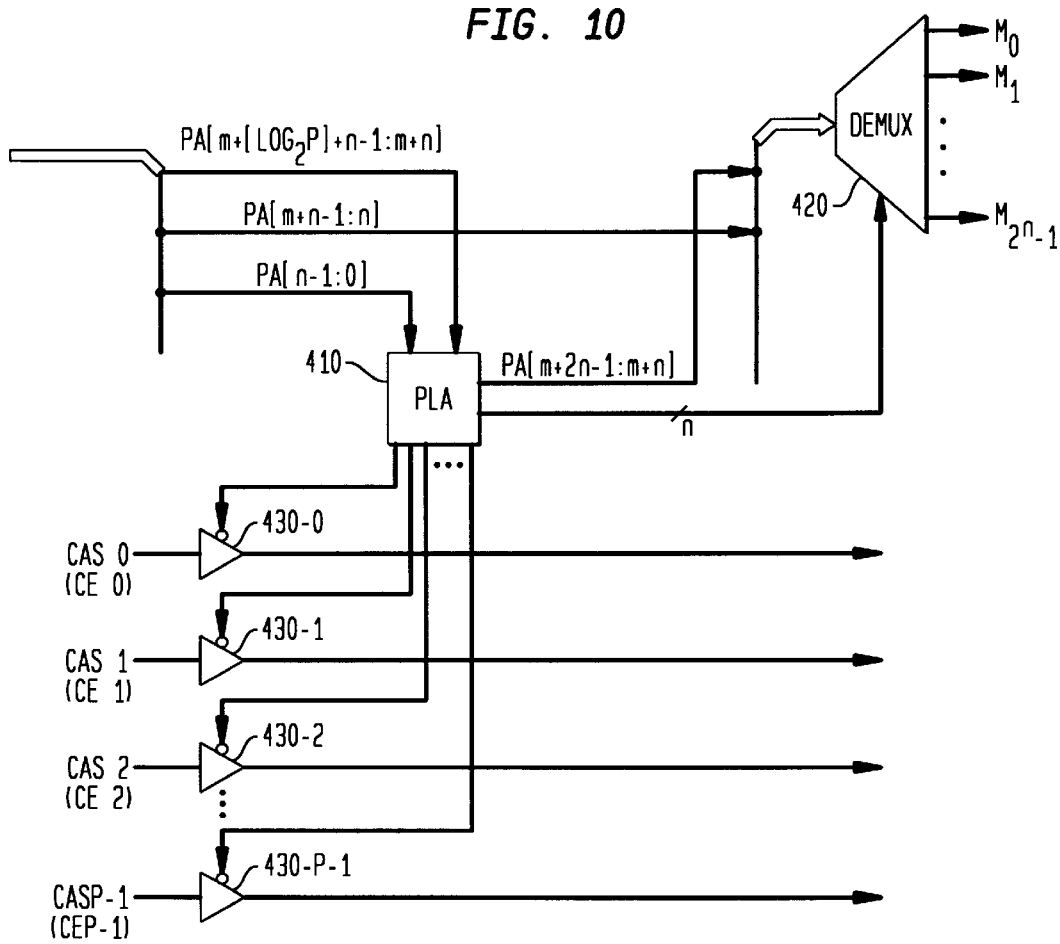
FIG. 10 illustrates a memory controller according to an embodiment of the present invention.

FIG. 10 illustrates an illustrative memory controller circuit 132 according to an embodiment of the invention. In this embodiment, a high speed programmable logic array (PLA) 410 is utilized to stored the above-noted look up table. A pixel address PA[$\lceil \log_2 P \rceil$+m+n-1:0] is inputted to the memory controller 132. The number of bits in the pixel address is equal to the number of bits m in each memory bank plus a number of bits n for distinguishing each memory bank over which $2^n$-way interleaving is performed plus a number of bits $\lceil \log_2 P \rceil$ for identifying over which group of partitions the pixel address has been interleaved. The bits PA[$\lceil \log_2 P \rceil$+m+n-1:m+n] and the bits PA[n-1:0] are stripped from the inputted address. These bits illustratively are concatenated to form an input look up value PA[$\lceil \log_2 P \rceil$+m+n-1:m+n], PA[n-1:0]. The input look up value PA[$\lceil \log_2 P \rceil$+m+n-1:m+n],PA[n-1:0] is inputted to the PLA 410. In response, the PLA generates an offset PA[m+2n-1:m+n]' as described above. The offset PA[m+2n-1:m+n]' is concatenated with the remaining portion of the inputted pixel address PA[m+n-1:n] to form PA[m+2n-1:m+n]', PA[m+n-1:n]. This concatenated address is inputted to an n to $2^n$ demultiplexer 420. Each demultiplexer output is one of the $2^n$ memory address lines M0, M1, . . . , M$2^n$-1 shown in FIG. 9. These address lines are analogous to the memory address lines MA and MB in FIGS. 6 and 7 and memory address lines MA, MB, MC and MD in FIG. 8. The PLA 410 also outputs an n-bit selector to the demultiplexer 420 for selecting the correct memory address lines onto which the concatenated memory address should be outputted.

The PLA 410 also outputs an enable signal to enable one of the tri-state buffers 430-0, 430-1, . . . , 430-P-1. Each tri-state buffer 430-0, 430-1, . . . , 430-P-1 controls the outputting of a respective memory control signal CAS0, CAS1 . . . . CASP-1. (Instead of CAS signals, the tri-state buffers 430-0, 430-1, . . . , 430-P-1 could control the outputting of chip enable signals CE0, CE1, . . . , CEP-1.) In response to the input look up value PA[$\lceil \log_2 P \rceil$+m+n-1:m+n], PA[n-1:0], the PLA 410 outputs a single enable signal for enabling the appropriate memory bank.

In short, a method and system for performing $2^n$-way interleaving of data words over P memory banks is disclosed. Each of the memory banks is partitioned into $2^n$ partitions. The data word (pixel) address space is partitioned into P contiguous sequences. Each of the P sequences of data word addresses is associated with a unique group of $2^n$ partitions. In each group, each partition is in a different memory bank. The data word addresses of each of the P sequences is then interleaved over its associated group of partitions. In interleaving the sequence of data word addresses, the data word addresses are alternately associated with sequential memory addresses in the group of partitions in a round-robin fashion.

Finally, the above-discussion covers illustrative embodiments of the invention. Those having ordinary skill in the art may devise numerous alternative embodiments without departing from the spirit and scope of the following claims.

The claimed invention is:

1. A method for interleaving data in P>2 memory banks comprising the steps of:

partitioning the storage locations of each of said P memory banks into $2^n$ partitions, where $n \geq 1$, ordering said $2^n$ partitions with a unique combination of indexes i,j where i and j are integers, $0 \leq i \leq P-1$, $0 \leq j \leq 2^n-1$, such that each $p^{th}$ memory bank in the range $2^n \leq p \leq P-1$ contains the $2^n$ partitions labeled (p,0), (p-1,1), . . . , (p-$2^n$+1,$2^n$-1) and each $p^{th}$ memory bank in the range 0 to $2^n$-1 contains $2^n$-p-1 partitions labeled (P-1,$2^n$-p-1), (P-2,$2^n$-p-2), . . . , (P-$2^n$-p-1,$2^n$-1) and p+1 partitions labeled (0,p), (1,p-1), . . . , (p,0), wherein each of said P groups of partitions comprises partitions having the same index i, partitioning data word addresses of a sequential block of data words into P sequences of data word addresses, associating a different group of $2^n$ of said partitions of said P memory banks with each of said P sequences of data word addresses such that each one of said $2^n$ partitions in each group of partitions is located in a different memory bank, interleaving each data word address of each of said P sequences of data word addresses over said $2^n$ partitions of said associated group of partitions so that each data word corresponding to a subsequence of $2^n$ data word addresses of said sequence of data word addresses is stored in a different one of said partitions of said associated group of partitions, and associating each address of said sequence of P addresses with a sequential memory address in said partition in round robin fashion in order of said index j of said partition.

2. The method of claim 1 further comprising the steps of:

outputting a single RAS signal to each of said P memory banks for strobing in a row component of a memory address thereto, and outputting a plurality of CAS signals, including one CAS signal to each of said P memory banks, for strobing in a column component of said memory address.

3. The method of claim 1 further comprising the steps of:

outputting a plurality of memory addresses for data words to be accessed in said memory banks, including $2^n$ memory addresses, said $q^{th}$ memory address, for $0 \leq q \leq 2^n-1$ being outputted to each memory bank containing a partition (p,0) for which p modulus $2^n$=q.

4. The method of claim 3 wherein each partition comprises a particular range of memory addresses of a respective memory bank, and wherein each partition having a particular index i in different memory banks which also receive the same $q^{th}$ memory address have identical ranges of memory addresses in said respective different memory banks.

5. The method of claim 1 wherein each memory bank comprises $2^{th}$ storage locations and wherein said starting memory addresses for each partition, for p in the range of $2^n \leq p \leq P-1$, is $(i-p+2^n-1) \cdot 2^{m-n}$, said starting memory address for each partition $(P-1, 2^n-p-1)$, $(P-2, 2^n-p-2)$, ..., $(P-2^n-p-1, 2-1)$, for p in the range of $0 \leq p \leq 2^n-1$, is $(i-P+2^n) \cdot 2^{m-n}$ and said starting memory address for each partition (0,p), (1, p-1), ..., (p,0), for p in the range of $0 \leq p \leq 2^n-1$, is $i \cdot 2^{m-n}$.

6. In a computer system wherein a sequence of data word addresses of a sequential block of data words is partitioned into P sequences of data word addresses, a memory comprising:

P memory banks having a plurality of storage locations, which storage locations of each memory bank are partitioned into $2^n$ partitions, where $n \geq 1$, wherein each of said partitions are organized into P groups of $2^n$ partitions from different memory banks, said $2^n$ partitions having a unique combination of indexes i,j where i and j are integers, $0 \leq i \leq P-1$, $0 \leq j \leq 2^{n-1}$, such that each $p^{th}$ memory bank in the range $2^n \leq p \leq P-1$ contains the $2^n$ partitions labeled (p,0), (p-1,1), ..., (p-$2^n$+1,$2^n$-1) and each $p^{th}$ memory bank in the range 0 to $2^n-1$ contains $2^n-p-1$ partitions labeled (P-1,$2^n$-p-1), (P-2,$2^n$-p-2), ..., (P-$2^n$-p-1,$2^n$-1) and p+1 partitions labeled (0,p), (1,p-1), ..., (p,0), wherein each of said P groups of partitions comprises partitions having the same index i, wherein each of said P groups of partitions is associated with a different one of said P sequences of data word addresses, each said address of said sequence of P addresses being associated with a sequential memory address in said partition in round robin fashion in order of said index j of said partition, and wherein said data word addresses of each sequence are interleaved over said $2^n$ partitions of said associated group of partitions so that each data word corresponding to a subsequence of $2^n$ data word addresses of said sequence of data word addresses is stored in a different one of said partitions of said associated group of partitions.

7. A computer system, wherein a sequence of data word addresses of a sequential block of data words is partitioned into P sequences of data word addresses, said computer system comprising:

a bus, a processor connected to said bus, and a memory circuit connected to said bus comprising P memory banks having a plurality of storage locations, which storage locations of each memory bank are partitioned into $2^n$ partitions, where $n \geq 1$, said $2^n$ partitions having a unique combination of indexes i,j where i and j are integers, $0 \leq i \leq P-1$, $0 \leq j \leq 2^n-1$, such that each $p^{th}$ memory bank in the range $2^n \leq p \leq P-1$ contains the $2^n$ partitions labeled (p,0), (p-1,1), ..., (p-$2^n$+1,$2^n$-1) and each $p^{th}$ memory bank in the range 0 to $2^n-1$ contains $2^n-p-1$ partitions labeled (P-1,$2^n$-p-1), (P-2,$2^n$-p-2), ..., (P-$2^n$-p-1,$2^n$-1) and p+1 partitions labeled (0,p), (1,p-1), ..., (p,0), wherein each of said P groups of partitions comprises partitions having the same index i, wherein each of said partitions are organized into P groups of $2^n$ partitions from different memory banks, wherein each of said P groups of partitions is associated with a different one of said P sequences of data word addresses, each said address of said sequence of P addresses being associated with a sequential memory address in said partition in round robin fashion in order of said index j of said partition, and wherein said data word addresses of each sequence are interleaved over said $2^n$ partitions of said associated group of partitions so that each data word corresponding to a subsequence of $2^n$ data word addresses of said sequence of data word addresses is stored in a different one of said partitions of said associated group of partitions.

8. The computer system of claim 7 further comprising:

a graphics controller, including a memory controller connected to said bus and to said memory circuit, and a display device connected to said memory circuit, wherein said memory circuit is a frame buffer, wherein said data words are pixel data, and wherein said interleaving decreases a delay in accessing said pixel data so that said pixels of said pixel data can be displayed on said display device according to a pixel display rate of said display device.

* * * * *